(12) United States Patent
Mahoney et al.

(10) Patent No.: US 8,510,211 B2
(45) Date of Patent: *Aug. 13, 2013

(54) SYSTEM AND METHOD FOR INTEGRATING A DARK TRADING FACILITY AND A SECURITIES EXCHANGE

(75) Inventors: Timothy J. Mahoney, Westfield, NJ (US); Duncan L. Niederauer, Bernardsville, NJ (US)

(73) Assignee: NYBX, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,985

(22) Filed: Jul. 2, 2012

(65) Prior Publication Data

US 2012/0271752 A1 Oct. 25, 2012

Related U.S. Application Data

(63) Continuation of application No. 12/258,376, filed on Oct. 24, 2008, now Pat. No. 8,271,375.

(60) Provisional application No. 60/982,290, filed on Oct. 24, 2007.

(51) Int. Cl.
*G06Q 40/04* (2012.01)

(52) U.S. Cl.
CPC ................................. *G06Q 40/04* (2013.01)
USPC .................................................. 705/37

(58) Field of Classification Search
CPC ....................................................... G06Q 40/04
USPC .................................................. 705/37
See application file for complete search history.

(56) References Cited

U.S. PATENT DOCUMENTS

2002/0073016 A1* 6/2002 Furbush et al. ................ 705/37
2010/0293109 A1* 11/2010 Jain et al. .................... 705/36 R

* cited by examiner

*Primary Examiner* — Elda Milef
*Assistant Examiner* — Joan Goodbody
(74) *Attorney, Agent, or Firm* — Wilmer Cutler Pickering Hale and Dorr LLP

(57) ABSTRACT

A system and method are described for the providing securities exchange members increased liquidity for affecting trades. Securities exchange members will have access to both a Dark Trading Facility and securities exchange for trading. When trading on the security exchange, these members will be able to access the Dark Trading Facility using the security exchange infrastructure. Further, when such members enter orders onto the Dark Trading Facility, they will have access to the security exchange display book from the dark pool of the Dark Trading Facility. The trading transactions executed in the Dark Trading Facility or initiated by the Dark Trading Facility, preferably, are automatic and anonymous.

19 Claims, 7 Drawing Sheets

302 — NBBO = 122.20 ISE - 122.26 PHLX   5000 x 10,000   300

304 — Trading Facility Order No. 1   =   Sell 5000 shares at 122.25

306 — Securities Exchange DBK
       Order No. 1   =   Sell 5000 shares at 122.26

308 — PHLX Order   =   Sell 10,000 shares at 122.26

310 — Trading Facility Order No. 2   =   Buy 100,000 shares at 122.26 MTV 7000 Day Order

502 — Buy Order for 100,000 shares
       MTV 50,000 shares at 101.20

504 — Securities Exchange depth at 101.20   =   54,000 shares
506 — Away Markets   =   4600 shares at 101.15
508 — Other Trading Facility Orders   =   10,000 shares at 101.16

FIG. 5

NBBO = 101.10 TO 101.15

Securities Exchange Display Book

| Buy Volume | | Price | Sell Volume | |
|---|---|---|---|---|
| Reserve | Display | | Display | Reserve |
| | | 101.21 | 2000 | 40,000 |
| | | 101.20 | 700 | 20,000 |
| | | 101.19 | 1000 | 15,000 |
| | | 101.18 | 500 | 7500 |
| | | 101.17 | 1000 | 4000 |
| | | 101.16 | 800 | 0 |
| | | 101.15 | 1500 | 2000 |
| 3500 | 500 | 101.10 | | |
| 4000 | 500 | 101.09 | | |
| 0 | 1000 | 101.08 | | |
| 10,000 | 800 | 101.07 | | |

Rolled by Price

| Buy Volume | Price | Sell Volume |
|---|---|---|
| | 101.21 | 96,000 |
| | 101.20 | 54,000 |
| | 101.19 | 33,300 |
| | 101.18 | 17,300 |
| | 101.17 | 9300 |
| | 101.16 | 4300 |
| | 101.15 | 3500 |
| 4000 | 101.10 | |
| 8500 | 101.09 | |
| 9500 | 101.08 | |
| 20,300 | 101.07 | |

Away Markets

| Market | Price | |
|---|---|---|
| | NBB: 101.10 | NBO: 101.15 |
| NASDAQ | 1500 | 1000 |
| ISE | 500 | 500 |
| CHX | 800 | 1000 |
| NYSE Arca | 2000 | 2000 |
| AMEX | 200 | 100 |
| Total | 5000 | 4600 |

Trading Facility System Database

| Buy Volume | Price | Sell Volume |
|---|---|---|
| | 101.16 | 10,000 |
| 30,000 | 101.09 | |

602 — Buy Order for 200,000 shares
       MTV 100,000 shares at 101.21

604 — Securities Exchange depth at 101.21 = 96,000 shares
606 — Away Markets = 4600 shares at 101.15
608 — Other Trading Facility Orders = 10,000 shares at 101.16

The market is 20.00 to 20.05. The securities exchange is the NBBO with a 1000 shares of ABC security to buy and 1000 shares of ABC security to sell. — 702

Order No. 1 enters the Trading Facility for 100,000 shares of ABC security to buy with a MTV of 100,000 shares and a midpoint peg at time 1:00:00. — 704

Order No. 2 enters the Trading Facility with 25,000 shares of ABC security to sell with a MTV of 25,000 shares and a midpoint peg at time 1:05:00 — 706

Order No. 3 enters the Trading Facility with 50,000 shares of ABC security to sell with a MTV of 50,000 shares and a midpoint peg at time 1:10:00. — 708

Order No. 4 enters the Trading Facility with 100,000 shares of ABC security to sell with a MTV of 100,000 shares and a midpoint peg at time 1:18:00. — 710

NBBO = 122.20 ISE - 122.26 PHLX    5000 x 10,000 — 802

Trading Facility Order No. 1 = Sell 5000 shares at 122.26 no MTV — 804

Securities Exchange DBK
    Order No. 1 = Sell 5000 shares at 122.27 — 806

PHLX Order = Sell 10,000 shares at 122.26 — 808

Trading Facility Order No. 2 = Buy 100,000 shares at 122.27 no MTV — 810

NBBO = 122.20 ISE - 122.26 PHLX    5000 x 10,000 — 902

Trading Facility Order No. 1    =    Sell 5000 shares at 122.26 no MTV — 904

Securities Exchange DBK
    Order No. 1                 =    Sell 5000 shares at 122.26 — 906

PHLX Order                      =    Sell 10,000 shares at 122.26 — 908

Trading Facility Order No. 2    =    Buy 5,000 shares at 122.26 no MTV
                                                                    910

NBBO = 122.20 ISE - 122.26 PHLX    5000 x 5000 — 1002

Trading Facility Order No. 1    =    Sell 5000 shares at 122.25 no MTV
                                                                    1004
Securities Exchange DBK
    Order No. 1                 =    Sell 5000 shares at 122.27 — 1006

PHLX Order                      =    Sell 5000 shares at 122.26  — 1008

Trading Facility Order No. 2    =    Buy 100,000 shares at 122.25 no MTV
                                                                    1010

NBBO = 20.00 PHLX - 20.05 ISE —1102

Trading Facility Order No. 1 = Buy 50,000 shares MTV 20,000 at 20.02 —1104

Trading Facility Order No. 2 = Sell 100,000 shares MTV 20,000 ay 20.00 —1106

NBBO = 122.20 ISE - 122.26 PHLX   5000 x 10,000 —1122

| Securities Exchange DBK Order No. 1 | = | Sell 5000 shares at 122.26 —1124 |
| Securities Exchange DBK Order No. 2 | = | Buy 5000 shares at 122.20 —1126 |
| Trading Facility Order No. 1 | = | Sell 75,000 shares MTV 50,000 at 122.22 —1128 |
| Trading Facility Order No. 2 | = | Buy 100,000 shares MTV 50,000 Day at 122.26 no MTV —1130 |

FIG. 11B

SYSTEM AND METHOD FOR INTEGRATING A DARK TRADING FACILITY AND A SECURITIES EXCHANGE

CROSS REFERENCE TO RELATED APPLICATIONS

This application is a continuation of U.S. patent application Ser. No. 12/258,376, entitled System and Method for Integrating a Dark Trading Facility and a Securities Exchange, filed Oct. 24, 2008, now U.S. Pub. No. 2009/0210337, which claims the benefit under 35 U.S.C. §119(e) of U.S. Provisional Application No. 60/982,290, filed Oct. 24, 2007, both incorporated by reference herein in their entirety.

TECHNICAL FIELD

The present invention relates to systems and methods that are used for enhancing liquidity in fragmented markets with disparate single-purpose venues.

BACKGROUND OF THE INVENTION

In the United States and throughout the world there are traditional exchanges for trading securities. In the United States these exchanges would include the New York Stock Exchange, NASDAQ, and American Stock Exchange. In Asia, it would include the Australian Securities Exchange, Taiwan Stock Exchange, the Hong Kong Stock Exchange, Shenzhen Stock Exchange, Tokyo Stock Exchange, and Stock Market Division of Korea Exchange. In Europe, it would include the London Stock Exchange, Paris Bourse, Frankfurt Stock Exchange, and SWX Swiss Exchange. In South America, it would include the Rio de Janeiro Stock Exchange, Santiago Stock Exchange, Jamaica Stock Exchange, and Caracas Stock Exchange. Normally, each of these exchanges would be approved under the appropriate governmental laws and regulations, and organized so that its members would be able to trade common stock in listed companies. These traditional exchanges are called "Displayed Markets". Displayed Markets provide price quotes for transactions on that venue to the market at large.

In recent years, dramatic increases in the capability of computer and telecommunications technologies, changes to the organizational structure of large market participants as well as changes to the national market structure precipitated by regulatory changes have caused the emergence and growth of a variety of electronic equity trading venues that capture order flow. With barriers to entry in the industry substantially lower, innovative entrepreneurs are also able to offer traditional order matching and execution services faster, and cheaper providing certainty of order fulfillment sooner. These trading venues consist of internalized order flow at broker-dealers, Electronic Communication Networks (ECNs) and Alternative Trading Systems (ATSs). Many of these venues are also a "Non-Displayed Market" where buy and sell orders cross without the benefit of publicly available quotes. These Non-Displayed markets are commonly referred to as "dark pools" of liquidity.

While the proliferation of these liquidity pools expand investors' options in choosing a trading venue that best suits their needs for a particular order, this growth has also caused market fragmentation. The result is that getting a large order executed without an impact to the securities market at large has become very difficult.

Until the present invention, traditional securities exchanges and dark pools (a/k/a Displayed and Non-Displayed Markets) have operated as separate trading facilities.

Investors desire access to liquid, high quality markets, as well as speed and certainty of execution without market dislocation. The present invention provides a solution to the problem by allowing Displayed and Non-Displayed to interact without a dislocation to the market.

SUMMARY OF THE INVENTION

The present invention is a system and method for participants (e.g. ATSs, ECNs, Exchanges, Broker-Dealers) in both Displayed and Non-Displayed markets to place orders in a dark trading facility that is connected to a Public Display Market.

Exchange members will be able to access the Dark Trading Facility using the exchange infrastructure to place orders. Other market participants can have a separate access to the Dark Trading Facility for conducting transactions.

The Dark Trading Facility will act as both a matching engine and an order router. As such, the Dark Trading Facility will have access to both displayed and non-displayed orders on the security exchange and orders sent to it from participants. If the matching engine of the Dark Trading Facility identifies an opportunity trade with contra side orders residing in the Dark Trading Facility system database, it will execute the trade and record it through the securities exchange with a special designation. The second type of trade that the Dark Trading Facility will be involved with is where the Dark Trading Facility identifies an opportunity for a trade between an order entered on the Dark Trading Facility from participants and the securities exchange display book. In these situations, the Dark Trading Facility will route that order to the securities exchange for execution, and the trade will be recorded through the securities exchange as a normal trading transaction.

The present invention creates a new type of trading venue that for the first time will allow display and reserve orders to interact with dark orders facilitating the execution of large transactions. Exchange members and participants can enter an order's volume and price, and the analytical programs that run the venue continuously search its own dark book as well as displayed and reserve orders executing the trade when it aggregates sufficient liquidity at the price point and printing it to the exchange tape will be described in greater detail in a remainder of the specification referring to the drawings.

BRIEF DESCRIPTION OF THE DRAWINGS

FIG. 3 shows an exemplary NBBO and representative orders for describing trades when there is a MTV designation for at least one order.

FIG. 4 shows an exemplary NBBO and representative snapshots of the Securities exchange display book, rollup of prices, away markets, and Dark Trading Facility system database.

FIG. 5 shows an exemplary set of order information that will be used for describing the handling of residual shares and modification of the MTV.

FIG. 6 shows an exemplary set of order information that will be used for describing order evaluation and allocation.

FIG. 7 shows an exemplary set of information that will be used for describing price/time priority preemption.

FIG. 8 shows an exemplary NBBO and representative orders for describing execution priority and trade through of a protected quote.

FIG. 9 shows an exemplary NBBO and representative orders for describing the operation of the Dark Trading Facility with regard to equal or better prices.

FIG. 10 shows an exemplary NBBO and representative orders for describing the operation of the Dark Trading Facility when the Dark Trading Facility has the best price.

FIGS. 11A and 11B show exemplary NBBOs and representative orders for describing the operation of the Dark Trading Facility when orders cross in the Dark Trading Facility.

DESCRIPTION OF THE INVENTION

Figure 1:
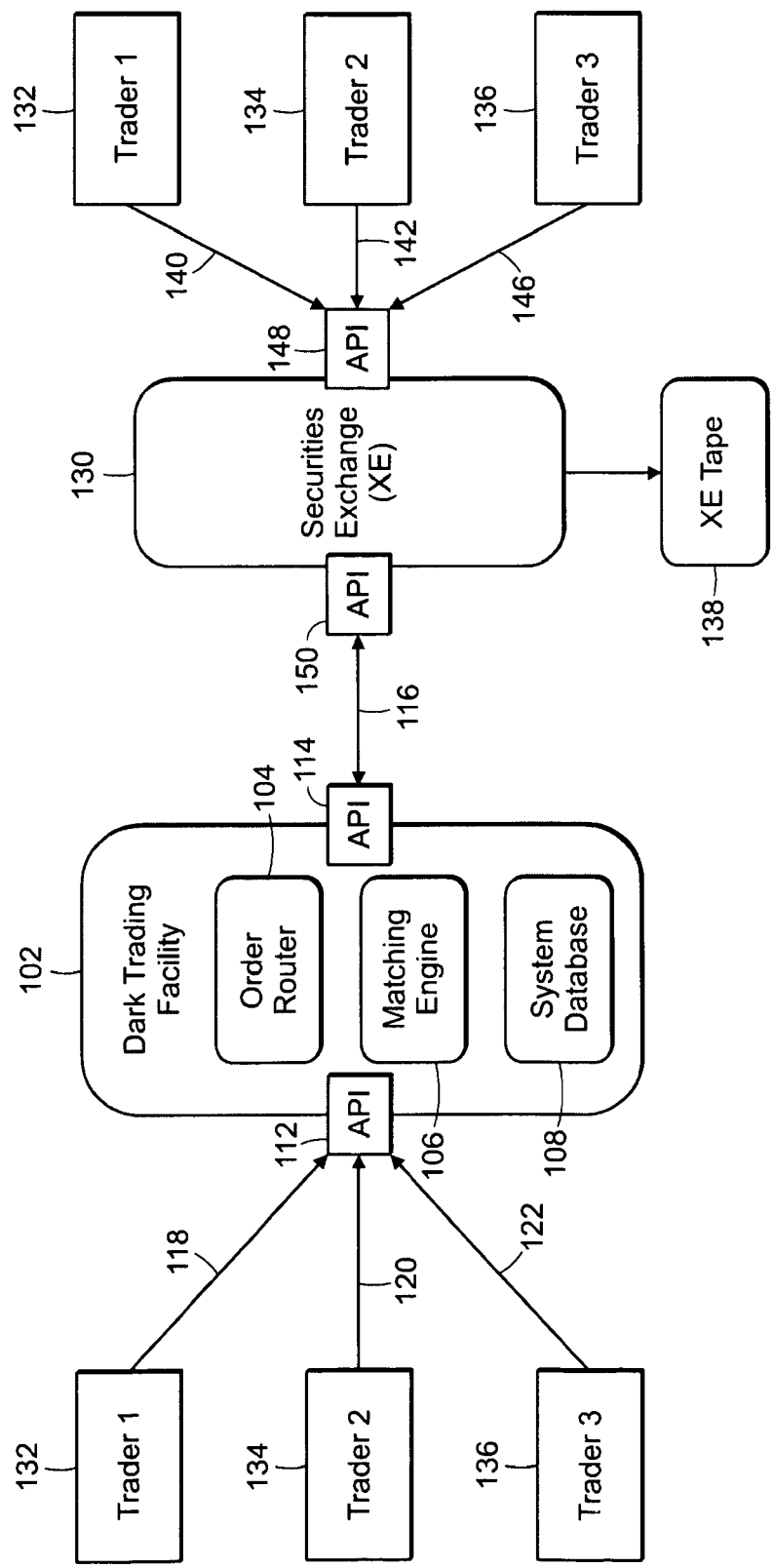
FIG. 1 shows a block diagram of the system as of the present invention.

The present invention is a system and method for the integration of a security exchange and a dark pool so that authorized securities Traders will have the ability to trade on either the Dark Trading Facility or the securities exchange to provide the best venue for trading a particular order, large block size or otherwise. The integration of a securities exchange and Dark Trading Facility provides "Displayed" and "Non-Displayed" trading markets for Traders that are members of the securities exchange.

Securities exchange member orders submitted to the exchange will have indirect access to orders entered on the Dark Trading Facility through the exchange infrastructure. These members also may decide to enter orders on the Dark Trading Facility so that it may trade anonymously within the Dark Trading Facility or against orders listed on the exchange display book. For example, the Dark Trading Facility may be a preferred trading venue for large block trades which could adversely impact market price if such a trade were made visible on the securities exchange display book. Orders may also be split and part will be listed on the securities exchange display book and part entered on the Dark Trading Facility.

The following acronyms and definitions shall be used in describing the system and method of the present invention:

ACRONYMS AND DEFINITIONS

"DBK" means a securities exchange display book.
"ISE" means International Securities Exchange.
"MTV" means minimum triggering volume quantity.
"MPV" means minimum price variation.
"NBBO" means National Best Bid and Best Offer.
"PHLX" means Philadelphia Stock Exchange.
"PRL" means partial round lot.
"TIF" means time in force condition.
"Limit Order" means an order that is executed within a specified range of prices.
"Market Maker" means a professional securities dealer or person that stands ready to buy and sell a particular stock on a regular and continuous basis at a publicly quoted price.
"Market Order" means an order to buy or sell securities immediately at the best price obtainable in the market.
"NMS" (National Market System) means a centralized system for reporting transactions and quotations from all qualified market makers, such as the NASDAQ.
"Protected Bid" or "Protected Offer" means a quotation in an NMS stock that: (i) is displayed by an automated trading center; (ii) is disseminated pursuant to an effective NMS plan; and (iii) is an automated quotation that is the best bid or best offer of a national securities exchange or a national securities association.

"Securities Exchange Trade-Through" is an event that occurs when a member on the securities exchange initiates the purchase of a security traded through an ITS (an ITS Security) at a price that is higher than the price at which the security is being offered (or initiates a sale on the securities exchange of such a security at a price that is lower than the price at which securities are being bid for) at the time of the purchase (or sale) to another ITS participating markets center as reflected by the offer (bid) then being displayed on the securities exchange which from such other markets center.

"Third Participating Market Center Trade-Through" is an event that occurs when a member on the securities exchange initiates the purchase of a security by sending a commitment to trade through the system and such commitment results in an execution at a price that is higher than the price at which the security is being offered (or initiates the sale of such a security by sending a commitment to trade through the system and such commitment results in an execution at a price that is lower than the price at which the security is being bid for) at the time of the purchase (or sale) in another participating market center as reflected by the offer (bid) then being displayed on the securities exchange from such other market center.

"Trade-Through" means the completion of an order at a price inferior to the best posted bid or offer. For example, the market maker who received the order is unable or unwilling to fill the order at the best posted bid or offer price, and as a result, the trade is instead executed at the Market Maker's price.

"Dark Trading Facility Day Order or "Day Order" means an order that if not executed, expires at the end of the regular trading session of the day on which it is entered. If the order is not executed by the end of the regular trading session, the order or a portion thereof not executed will be canceled back to the Dark Trading Facility User.

"Dark Trading Facility GTT Order" (Dark Trading Facility Good Till a Specified Time Order) means an order that is available for trading until a specified time, after which the order or the portion thereof not executed will be canceled back to the Dark Trading Facility User.

"Dark Trading Facility IOC Order" (Dark Trading Facility Intermediate or Cancel Order) means a limit order that is to be executed in whole or in part as soon as such order is entered into the Dark Trading Facility, and the entire order or portion thereof not executed will be canceled back to the Dark Trading Facility User.

"Dark Trading Facility IOS IOC Order" (Dark Trading Facility Intermarket Sweep Intermediate or Cancel Order) means an order that is sent by the Dark Trading Facility to the securities exchange DBK which will execute against all available contra side liquidity on the securities exchange DBK to the fullest extent possible. If a residual order remains, a residual order will be returned to the Dark Trading Facility where it will remain until it executes against additional contra side liquidity or be canceled back to the Dark Trading Facility User without routing to other automated trading centers for execution.

"Dark Trading Facility Market Pegging Order" means a market order that is pegged to buy at the national best offer (NBO) or sell at the national best bid (NBB) plus or minus the securities exchange MPV.

"Dark Trading Facility Midpoint Pegging Order" means an order with an instruction to peg to the midpoint of the NBBO.

"Dark Trading Facility Primary Pegging Order" means an order that is pegged to buy at the NBB or sell at the NBO plus or minus the securities exchange MPV.

"Dark Trading Facility User" means any member or member organization, sponsoring member organization, or sponsored participant at authorized trader that is authorized to access the Dark Trading Facility through the securities exchange or authorized to directly access the Dark Trading Facility.

Referring to FIG. 1, generally at 100, a block diagram of the system of the present invention is shown. The system of the present invention includes Dark Trading Facility 102 and securities exchange 130. As shown, Dark Trading Facility 102 connects to securities exchange 130 via electronic communications link 116.

Preferably, Dark Trading Facility 102 will include an order router 104 for routing orders from the Dark Trading Facility to securities exchange 130. Dark Trading Facility 102 also includes matching engine 106 that is used for executing matches between orders newly entered on the Dark Trading Facility from Traders and orders stored in Dark Trading Facility system database 108. Since the Dark Trading Facility has access to the securities exchange DBK and away markets, the matching engine can identify trading opportunities in these markets and will route orders to the securities exchange and may also route to away markets using order router 104 to affect trades.

Preferably, Dark Trading Facility 102 will process orders that are confirmed for automatic execution. However, it is understood that other orders execution methods may be used by Dark Trading Facility 102 and still be within the scope of the present invention.

Referring to FIG. 1, a plurality of Traders are shown connected to securities exchange 130 and also Dark Trading Facility 102. These are shown as Trader 1 at 132, Trader 2 at 134, and Trader 3 at 136. Preferably, these Traders are securities exchange members that have access to the securities exchange and the Dark Trading Facility for transacting trades. Traders 1, 2, and 3 may be broker-dealers, other exchanges, e.g., the NASDAQ, Alternative Trading Systems (ATSs), Electronic Communications Network (ECN). The purposes of the present invention a "Trader" may be any entity authorized to trade securities and such entity will be within the scope of the present invention.

The transmission of orders from Trader 1 at 132 via electronic communications link 118, Trader 2 at 132 via electronic communications link 120, and Trader 3 at 136 via electronic communications link 122 to Dark Trading Facility 102 are unidirectional communications.

Referring to securities exchange 130, it will maintain a securities exchange DBK that will include displayed and reserve (non-displayed) amounts for securities. Securities exchange 130 has one or a plurality of Traders connected to it that is (are) qualified in accordance with the appropriate securities regulations and governing laws to trade on the securities exchange. Dark Trading Facility 102 has access to the securities DBK via bidirectional electronic communications link 116 that connects between API 114 of the Dark Trading Facility and API 150 of the securities exchange. Trader 1 at 132, Trader 2 at 134, and Trader 3 at 136 are only meant to be representative qualified Traders connected to the security exchange for transacting trades.

Order information on the securities exchange DBK is transmitted to Dark Trading Facility 102 via bidirectional electronic communications link 116 for the purpose of providing greater liquidity for matching the orders on the securities exchange DBK. If matching engine 106 of Dark Trading Facility 102 identifies a contra side trading opportunity on the securities exchange DBK, it will route the appropriate order that is posted or stored in Dark Trading Facility system database 108 to securities exchange 130 via bidirectional electronic communications link 116. The securities exchange 130 will execute the trade and this trade will be recorded on XE tape 138.

As shown in FIG. 1 (or FIG. 2), Dark Trading Facility 102 may include interface 112, including an application programming interface (API), to which electronic communications links 118, 120, and 122 will connect. The orders transmitted from Traders 1, 2, and 3 to Dark Trading Facility 102 will be processed by this API.

Also as shown in FIG. 1 (or FIG. 2), Dark Trading Facility 102 may include interface 114, including an API, to which electronic communications link 116 will connect. The order information transmitted from securities exchange 130 and orders transmitted from the Dark Trading Facility to the securities exchange will be processed by this API.

Further, as shown in FIG. 1 (or FIG. 2), securities exchange 130 may include interface 148, including an API, to which Trader 1 at 132, Trader 2 at 134, and Trader 3 at 136 will connect via communications links 140, 142, and 144, respectively. The orders transmitted from these Traders to the securities exchange will be processed by the API.

Lastly, as shown in FIG. 1 (or FIG. 2), securities exchange 130 may include interface 150, including an API, to which electronic communications link 116 will connect. The order information and order transmitted on this link will be processed by this API. It is understood that electronic communications links 116, 118, 120, 122, 140, 142, and 146 may be wired or wireless communications links and still be within the scope of the present invention.

Figure 2:
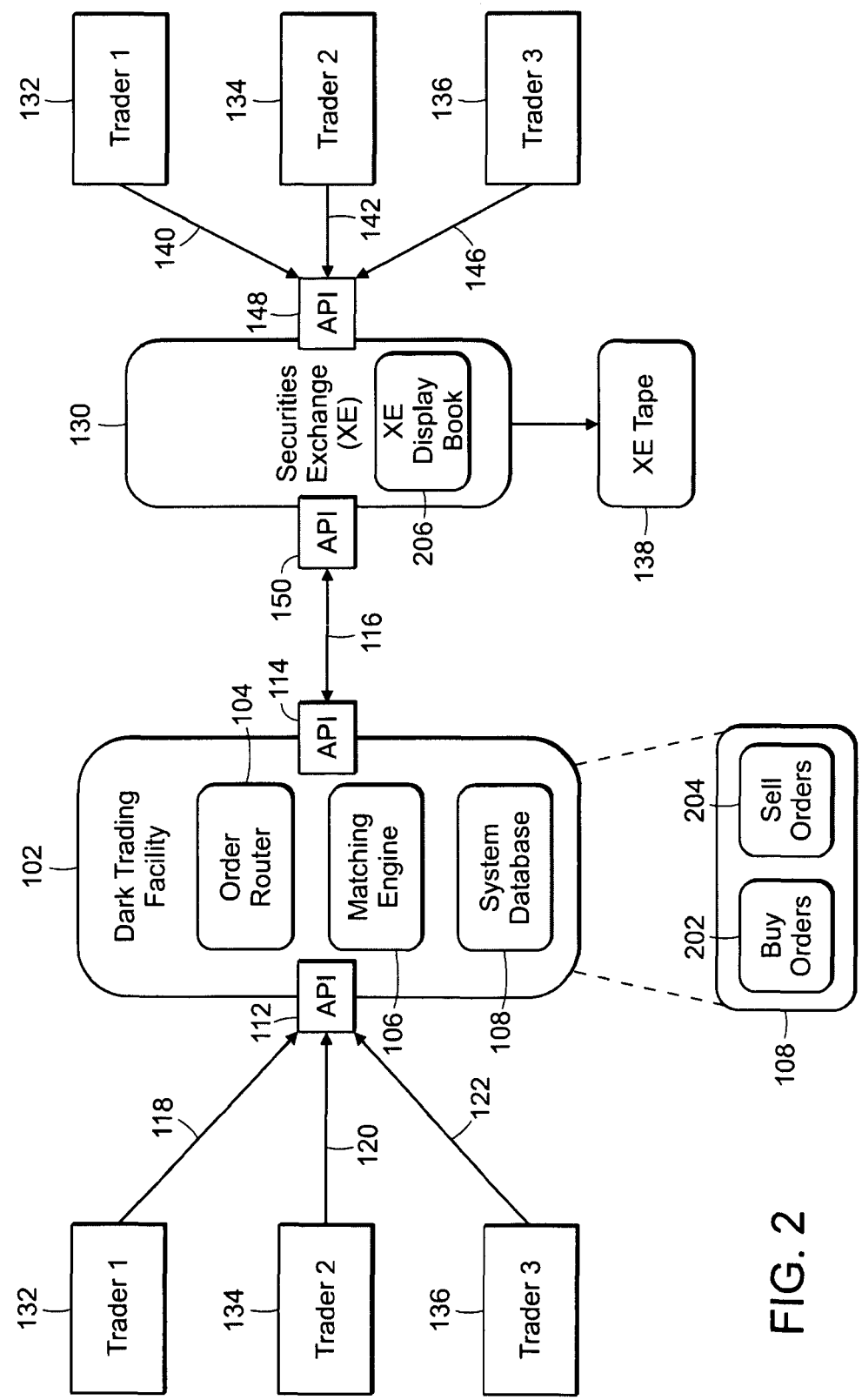
FIG. 2 shows a block diagram for describing trades carried out by the Dark Trading Facility of the present invention.

Referring to FIG. 2, generally a 200, a general description of the trades carried out by or through Dark Trading Facility 102 will be provided. Preferably, Traders 1, 2, and 3, will transmit block size orders or other orders desired to be traded in a dark liquidity pool to Dark Trading Facility 102 via electronic communications links 118, 120, and 122 for the purpose of finding matching contra side orders. This provides trading opportunities for Traders away from the securities exchange DBK.

For purposes of illustration, according to FIG. 2, contra side buy and sell orders from Traders 1, 2, and 3 will be posted and stored in system database 108. Buy orders are posted or stored at section 202 and sell orders at section 204. However, it is understood that other methods of posting and storing buy and sell orders may be used and still be within the scope of the present invention. For example, buy and sell orders may be cached upon entry for immediate matching and/or stored in various methods for presentation for matching and still be within the scope of the present invention.

When trades are executed within Dark Trading Facility 102 between contra side orders posted or stored in buy orders section 202 and sell orders section 204, a record of these transactions will be transmitted to securities exchange 130 and recorded on tape 138. However, the records of these trades will have a special designation when recorded on tape 138 to distinguish them from normal trades that are executed by securities exchange 130.

Display book 206 of securities exchange 130 has access via bidirectional communications link 116 to the block size or other size orders transmitted to Dark Trading Facility 102 from Traders 1, 2, and 3, and posted or stored in system database 108. If matching engine 106 identifies a trading opportunity between the posted or stored orders in Dark Trading Facility system database 108 and contra side orders on the securities exchange DBK, the matching engine will cause such posted or stored orders to be routed to the securities exchange for trading and execution, and the trade will be recorded on tape 138 of securities exchange 130.

Preferably, trades that are executed on Dark Trading Facility 102 or initiated based on orders routed to securities exchange 130 or away markets will be traded automatically and anonymously. Although the trades executed in the Dark Trading Facility or initiated by it are automatic and anonymous, upon execution of a trade, the contra side parties will be notified of trade execution in a manner that their records can be updated yet preserve the anonymity of such contra trading parties.

Dark Trading Facility 102 is also provided via bidirectional electronic communications link 140 with information about away markets. If after any opportunities to trade with the securities exchange DBK and within the Dark Trading Facility system database according to the operating rules of the Dark Trading Facility have been exhausted there remain additional trading opportunities in away markets. Preferably, Dark Trading Facility 102 will route the applicable orders through securities exchange 130 to the appropriate away market. The executed trade will be reported on XE tape 138 or otherwise in a conventional manner for trading with away markets.

Now that a general description of the operation of the system of the present invention has been provided, a more detailed description of the integration of Dark Trading Facility 102 and securities exchange 130 will be provided. This description will include the preferable operating methods for the present invention.

In the preferred embodiment of the present invention, Dark Trading Facility 102 permits securities exchange members, such as Traders 1, 2, and 3, to have an additional sources of liquidity without adversely affecting market trading conditions, such as making large block size trades that may not have been previously available to them on the securities exchange in an integrated manner. Dark Trading Facility 102 also will permit securities exchange members (Traders 1, 2, and 3) to execute smaller orders than block size orders on the Dark Trading Facility, and permit them to have access to multiple price points of displayed liquidity to meet size and price execution requirements. Further, Dark Trading Facility 102 will permit securities exchange members (Traders 1, 2, and 3) to have multiple sources to automatically and anonymously trade their large block size orders or other orders. Shares from these multiple sources along with shares posted and stored in the Dark Trading Facility can be aggregated and traded against each new order entered on the Dark Trading Facility.

Dark Trading Facility 102 will permit orders transmitted to the Dark Trading Facility from Traders 1, 2, and 3 to interact with the aggregate of displayed and reserve (non-displayed) orders on the securities exchange DBK and the marketable liquidity in away markets. Preferably, Dark Trading Facility 102 will evaluate trades considering the depth and away markets including protected quotes (protected bids or protective offers) of all automated trading centers listed on the security exchange. Also preferably, Dark Trading Facility 102 will trade only with respect to securities that are listed on security exchange 130. However, it is understood that other securities may be traded consistent with applicable laws, regulations, and rules.

The operating times of Dark Trading Facility 102 may follow the operating times of security exchange 130. However, since the Dark Trading Facility can operate 24 hours a day, to the extent that the hours of operation of securities exchange 130 increase to 24 hours a day, Dark Trading Facility 102 can operate 24 hours a day.

As described previously, preferably, Dark Trading Facility 102 is an anonymous trading system. As such, there will be no information displayed to the public or to the securities exchange members about the securities that are available for trading on the Dark Trading Facility. Further, clearance and settlement of trade executions occurring on or initiated by Dark Trading Facility 102 will be anonymous. However, a trade report will be generated after each trade execution to notify the involved parties of the consummation of a trade involving their security so their records may be updated.

Preferably, each Dark Trading Facility User is a securities exchange member and as such, will be authorized to access Dark Trading Facility 102. A Dark Trading Facility User may enter orders on their own behalf or on behalf of clients/customers. It is understood, that there may be defined requirements and rules to be followed for a person, firm, or entity, to qualify as a Dark Trading Facility User.

As stated, Dark Trading Facility Users, such as Trader 1 at 132, Trader 2 at 134, and Trader 3 at 136, will make their orders available on Dark Trading Facility 102, for automatic matching and execution. Preferably, the orders that Dark Trading Facility 102 will accept and execute, include, but are not limited to, limit orders, Dark Trading Facility IOC orders, Dark Trading Facility ISO IOC orders, and Dark Trading Facility NBBO Pegging Orders. Dark Trading Facility NBBO Pegging Orders include, but are not limited to, Dark Trading Facility Midpoint Pegging Orders, Dark Trading Facility Primary Pegging Orders, and Dark Trading Facility Market Pegging Orders. Preferably, all orders that are accepted by Dark Trading Facility 102 will have a minimum share size of round lots or PRLs. Although Dark Trading Facility 102 is capable of accepting Market Orders for trading and execution, preferably, such Market Orders are not traded on the Dark Trading Facility.

Preferably, each order that is accepted by Dark Trading Facility 102 for execution will include at least the following parameters: security symbol; limit price; side, e.g., buy, sell, short sell; and size of the order. However, it is understood that each order may be required to have more or less than the parameters just named and still be within the scope of the present invention.

A Dark Trading Facility User may also include other parameters as part of the order. For example, a TIF may be added to the order. If this parameter is added and the order is not matched and executed to meet the TIF, the order will be canceled. Preferably, if a Dark Trading Facility User does not designate a TIF for a given order, the order will be treated as a Dark Trading Facility Day Order and be canceled at the end of the trading day of the securities exchange if it is not matched and executed by that time.

Another parameter that a Dark Trading Facility User may choose to add to a specific order is a MTV designation. The MTV parameter will be a minimum amount of shares of a security against which an order will attempt to execute if there is sufficient contra side liquidity available on Dark Trading Facility 102 at the designated price. Preferably, the MTV may be determined (i) based on all contra side liquidity and protected quotes of all automated trading centers or (ii) based only on the contra side liquidity on the Dark Trading Facility 102 and the depth of the securities exchange DBK. Either determination may be used and still be within the scope of the present invention. If the Dark Trading Facility User does not include a MTV parameter with an order, the order will be matched and executed with any available contra side liquidity available to Dark Trading Facility 102. Further, if the Dark Trading Facility User includes an MTV parameter with an order but does not indicate which of the two types it is designating, the Dark Trading Facility will default to all available contra side liquidity and the protected quotes of all automated trading centers.

Although protected quotes are referred to in the present example, it is understood that the depth of the away markets could be considered and still be within the scope of the present invention.

When an order is entered on the Dark Trading Facility 102 from Trader 1 at 132, Trader 3 at 134, or Trader 3 at 136 with an MTV designation, a determination must be made whether the MTV is met before any trading can take place. If it is not met, the order with this designation will be stored in the Dark Trading Facility until it is met or the order is cancelled. Referring to FIG. 3, an exemplary evaluation of whether an MTV for an order is met will be described.

Referring to FIG. 3, generally a 300, an exemplary NBBO and exemplary Dark Trading Facility, securities exchange DBK, and away market orders are shown for determining if the conditions of any MTV are met. The determination of the MTV in accordance with FIG. 3 will be based on all contra side liquidity in the Dark Trading Facility and the securities exchange DBK and the protected quotes of all automated trading centers. More specifically, the determination of whether the MTV condition is met will review the contra side liquidity of the Dark Trading Facility, the securities exchange DBK depth of book, and the protected quotations from all automated trading centers.

Again referring to FIG. 3, at 302, the NBBO is shown for a particular security. According to the NBBO, the national best bid (NBB) is 122.20 on the ISE for 5,000 shares and the national best offer (NBO) is 122.26 on the PHLX for 10,000 shares.

Sell order section 204 of system database 108 includes Dark Trading Facility Order No. 1 shown at 304, which is a sell order for 5000 shares at a price of 122.25. Securities exchange DBK 206 (FIG. 2) includes a sell order for 5000 shares at a price of 122.26. The Philadelphia exchange (PHLX), an away market, includes a sell order for 10,000 shares at a price of 122.26.

Dark Trading Facility Order No. 2 is entered on Dark Trading Facility 102 by Trader 1, Trader 2, or Trader 3 for 100,000 shares at a price of 12.26 with a MTV of 7000 Day Order. There must now be a determination whether this buy order can be traded. Thus for MTV purposes, there must be at least 7000 shares at a price marketable or better than the designated price of 122.26 available to trade to meet the MTV condition.

From FIG. 3, the contra side orders available for Dark Trading Facility Order No. 2 to measure its MTV against are Dark Trading Facility Order No. 1 for 5000 shares and Securities Exchange Order No. 1 for 5000 shares. The PHLX Order for 10,000 shares, a protected offer from an away market, is aggregated with the previously described 10,000 shares. It is understood that the 10,000 shares on the PHLX may consist of one or more orders on the PHLX. The prices of these three sell orders are all marketable or better than the designated price of 122.26 so all are properly aggregated to determine if the MTV is met or referred to as the MTV being triggered. As such, there are 20,000 shares available for the MTV determination, so the MTV is triggered since only 7000 shares were required.

Once the MTV is triggered, there will be an allocation of shares for automatic and anonymous trading and execution. Trading Faculty 102 will send 95,000 shares of the Dark Trading Facility Order No. 2 buy order to securities exchange DBK 206 for trading and execution at a price of 122.26 ISO IOC. The Dark Trading Facility will also execute a trade internally for 5000 shares between the Dark Trading Facility Order No. 1 sell order and the Dark Trading Facility Order No. 2 buy order at a price of 122.25. However, no shares should be routed to protected quotes of the away markets to fill the PHLX Order(s) for 10,000 shares because it will not trade through the PHLX under these conditions. Also, no shares will be routed to the PHLX because the order had the ISO IOC designation that accompanied the shares sent to the securities exchange DBK thus, any residual shares are to be returned without being routed to the away markets.

With regard to the 95,000 shares of the Dark Trading Facility Order No. 2 buy order that were routed to the securities exchange, 5000 shares filled the securities exchange DBK 5000 share sell order at a price of 122.26 and 90,000 shares were returned to buy order section 202 of the system database 108 as the unfilled balance of the Dark Trading Facility Order No. 2 order at 122.26 with an MTV of 7000 shares.

Dark Trading Facility 102, preferably, is configured to act upon market and order information that is available to it at the time an order is entered into the Dark Trading Facility. Therefore, at the time an order is entered onto Dark Trading Facility 102 by a Trader, the Dark Trading Facility takes a "snapshot" of the market for a particular security. Preferably, this snapshot includes all orders for that security in Dark Trading Facility database 108, all displayed and non-displayed orders on securities exchange DBK 206, and protected quotations on automated trading centers (away markets). The orders that are part of the snapshot will be what the newly entered order from a Trader will trade against. Referring to FIG. 4, an example is provided for describing how the Dark Trading Facility snapshot coordinates order execution and the allocation of shares.

Referring to FIG. 4, generally at 400, the description of an exemplary snapshot will be provided of the market for a security when an order from a Trader is entered onto Dark Trading Facility 102. Again referring to FIG. 4, the NBBO range shown at 402 is 101.10 to 101.15. At 404, a snapshot of security exchange DBK 206 is shown. At 406, the buy volumes for reserve and display shares are shown. At 408, the sell volumes for display and reserve shares are shown. At 410, the prices for the various buy and sell volumes are shown.

At 416, a snapshot of the rollup of displayed and reserved (non-displayed) shares on the securities exchange DBK are shown. At 418, the total rolled up buy volumes are shown and the total rolled up sell volumes are shown at 420. At 422, the prices for the rollup buy and sell volumes are shown.

At 428, the snapshot of the away markets for the security at issue is shown. The representative away markets are shown at 430. The volumes for these away markets at the NBB are shown at 436 and at the NBO are shown at 438.

Finally, at 440, the snapshot of the market for the security interest in the Dark Trading Facility system database is shown. At 442, the buy volume is shown and at 444, the sell volume is shown. The prices of these volumes are shown at 446.

It is understood that the NBBO and snapshots of the market for a particular security on the securities exchange DBK, rollup of prices, away markets, and Dark Trading Facility system database that are shown in FIG. 4 are meant to be representative only and may differ in amounts and prices and still be within the scope of the present invention. Further, there may be greater numbers of buy and sell volumes and participants in the away markets in the snapshot and still be within the scope of the present invention.

In processing orders, Dark Trading Facility 102 will have situations where there will be remaining shares that have not been matched. According to the operation of Dark Trading Facility 102, these remaining shares, referred to as residual shares, will be stored in the appropriate section of system database 108 until later matched or the order is cancelled. However, if the residual share balance of an order that has being returned to Dark Trading Facility system database is less than the original MTV of the order, the MTV will be automatically adjusted to equal the residual share balance. When this happens, the order will continue to execute with available liquidity when and if the adjusted MTV can be met. Referring to FIG. 5, an example of processing residual shares and modification of the MTV will be described.

Referring to FIG. 5, generally at 500, an exemplary set of order information is provided for describing the handling of residual shares and modification of the MTV. At 502 of FIG. 5, a representative order is entered onto Dark Trading Facility 102 from a Trader, which is a buy order for 100,000 shares with an MTV of 50,000 shares at a price of 101.20. The snapshot of the market with which this new order will be compared will be based on the snapshot shown in FIG. 4.

The depth of securities exchange DBK 404 includes the displayed and reserved orders that have been rolled up as shown at 416 of FIG. 4. This amount is 54,000 shares, which is shown at 504 of FIG. 5. The away markets, as shown at 428 of FIG. 4, are 4600 shares at 101.15 (the NBO), which is shown at 506 of FIG. 5. The other Dark Trading Facility orders shown at 440 are 10,000 shares at 101.16, which is shown at 508 in FIG. 5.

Given the aggregate number of shares from the depth of the security exchange DBK, away markets, and other Dark Trading Facility orders is 68,600 shares at the marketable price or better than 101.20, the MTV of 50,000 shares at 101.20 was met at the time the order shown at 502 of FIG. 5 was entered. Dark Trading Facility 102 will send a buy order for 90,000 shares to the securities exchange DBK at a price of 101.20. Securities exchange 130 will execute trades for 54,000 shares. This will include 3500 shares at 101.15, 800 shares at 101.16, 5000 shares at 101.17, 8000 shares at 101.18, 16,000 shares at 101.19, and 20,700 shares at 101.20. Securities exchange 130 will also route ISO IOC orders to away markets. In accordance with the example, this will mean that 4,600 shares will be routed to the away markets at a price of 101.15. This will mean that 31,400 will be returned to the Dark Trading Facility as residual shares.

Dark Trading Facility 102 will execute a trade for 10,000 shares at 101.16 between the buy order that was just entered and the sell volume that was in the Dark Trading Facility system database. Given all of the executed trades, there will be 31,400 residual shares left in the Dark Trading Facility system database from the original 100,000 share buy order and the new MTV will be adjusted to equal this residual share amount at a price of 101.20.

Preferably, Trade Facility 102 will be operated to permit automated and anonymous trade executions to occur within, at, and through the NBBO. However, Trade Facility 102 will protect the bids and offers on the securities exchange DBK that are at the same price or better than the NBBO and protected quotations, protected bids or offers, on away markets (automated trading centers). The protected bids and offers on the securities exchange DBK will include the depth of the displayed and non-displayed (reversed, see FIG. 4) orders. Moreover, Dark Trading Facility orders, preferably, will be evaluated on a price/time priority basis to determine whether such orders are eligible to execute against available contra side liquidity based on the price and the MTV of the orders. These features will be shown in describing FIG. 6.

In executing trades, Dark Trading Facility also considers whether latency may occur when trading entities evaluate liquidity on other away markets or when orders are routed to such other away markets. An example of how this latency consideration is treated also is shown in describing FIG. 6.

Referring to FIG. 6, generally at 600, an exemplary set of order information is provided for demonstrating determining order evaluation and allocation. At 602 of FIG. 6, a representative order is entered onto Dark Trading Facility 102 by Trader 1, 2, or 3, which is a buy order for 200,000 shares with a MTV of 100,000 shares at 101.21. The snapshot of the market with which this new entering order will be compared will be based on the snapshot shown in FIG. 4. Accordingly, the depth of securities exchange DBK 404 at a price of 101.21, which includes the displayed and reserved orders that have been rolled up, is shown at 416 of FIG. 4. This amount is 96,000 shares, which is shown at 604 of FIG. 6. The away markets, as shown at 428 of FIG. 4, are 4600 shares at 101.15 (the NBO), which is shown at 606 of FIG. 6. The other Dark Trading Facility orders, as shown at 440 of FIG. 4, are 10,000 shares at 101.16, which is shown at 608 in FIG. 6.

Given the aggregate number of shares from the depth of the security exchange DBK, away markets, and other Dark Trading Facility orders is 110,600 shares at the marketable price or better than 101.21, the MTV of 100,000 shares at 101.21 is met at the time the order shown at 602 of FIG. 6 was entered. Dark Trading Facility 102 will send the buy order for 190,000 shares to the securities exchange DBK at a price of 101.21. Securities exchange 130 will execute trades for 96,000 shares. This will include 3500 shares at 101.15, 800 shares at 101.16, 5000 shares at 101.17, 8000 shares at 101.18, 16,000 shares at 101.19, 20,700 shares at 101.20, and 42,000 shares at 102.21. Securities exchange 130 will also route 4600 shares to the away markets at a price of 101.15. When the Dark Trading Facility ISO IOC orders are sent to the away markets, all are returned with fills except in the 1000 shares for the NASDAQ order. The NASDAQ order was not filled because of the latency associated with the time the snapshot was taken and the time the order was routed to the away markets for execution. During this latency period, the order may have been filled by another contra side order from another market participant or it could have been cancelled, and that is why it is no longer available for filling.

Dark Trading Facility 102 will execute a trade for 10,000 shares at 101.16 between the buy order that was just entered and the sell volume that was in the Dark Trading Facility system database. Given all of the executed trades, there will be 90,400 residual shares left in the Dark Trading Facility system database from the original 200,000 share buy order and the new MTV will be adjusted to equal this residual share amount at a price of 101.21.

When orders are entered into Dark Trading Facility 102, these orders are placed in price/time priority according to the preferred order parameters. Again, preferably, these parameters are security symbol; limit price; side, e.g., buy, sell, short sell; and size of the order. It is understood that other parameters may be used for determining the price/time priority, such as MTV, TIF, etc. Price/time priority sequencing may be affected and/or preempted in the allocation of orders when such orders have different order parameters, such as size and MTV designations. Referring to FIG. 7, an example of price/time priority preemption will be described.

Referring to FIG. 7, generally a 700, an exemplary NBBO and four orders entered in time sequence on Dark Trading Facility 102 are shown. At 702, the market is shown with an NBBO of 20.00 to 20.05 for 1000 shares to buy or sell ABC security, respectfully. The pricing of each of the four sequenced orders that is listed in FIG. 7 is pegged at the midpoint of the NBBO.

As shown at 704, Order No. 1 is entered on the Dark Trading Facility at time 1:00:00 and this order is a buy order for 100,000 shares of ABC security with MTV of 100,000 shares. As shown at 706, Order No. 2 is entered on Dark Trading Facility 102 at time 1:05:00 and this is a sell order for 25,000 shares of ABC security with a MTV of 25,000 shares. However, there can be no executions between Order No. 1 and Order No. 2 because the MTV of Order No. 1 has not been met.

As shown at 708, at time 1:10:00, Order No. 3 to sell 50,000 shares of ABC security with a MTV of 50,000 shares is entered on Dark Trading Facility 102. However, there can be no executions between Order No. 1 and Order No. 3 because the MTV of Order No. 1 has not been met by the aggregate of Order Nos. 1 and 2.

As shown at 710, at time 1:18:00, Order No. 4 to sell 100,000 shares of ABC security with the MTV of 100,000 shares is entered on Dark Trading Facility 102. However, there can be an execution between Order No. 1 and Order No. 4 because the MTV of Order No. 1 has been met by the aggregate of Order Nos. 2, 3, and 4. Order No. 4 will trade against Order No. 1 because upon entry it alone met the MTV condition of Order No. 1, and will preempt Order Nos. 2 and 3 in the order sequence because of the inability of Order Nos. 2 and 3 to meet the MTV condition.

Dark Trading Facility 102 will execute orders in a predetermined priority. Preferably, first, the Dark Trading Facility will review the available contra side liquidity at the Dark Trading Facility order's limit/pegged price on the securities exchange DBK. This will include displayed and non-display (reserved) liquidity. Second, the Dark Trading Facility will review the available contra side liquidity in the Dark Trading Facility system database at the Dark Trading Facility order's limit/pegged price. Third, the Dark Trading Facility will review the available contra side liquidity of all protected bids and offers on the away markets at the Dark Trading Facility order's limit/pegged price. However, Dark Trading Facility orders will not trade through any protected bids or offers. Referring to FIG. 8, any description for execution priority and trade through a protected quote will be provided.

Referring to FIG. 8, generally at 800, an exemplary NBBO and set of orders are shown that will be used for describing the execution priority and trade through of a protected quote. At 802, the NBBO is shown for a particular security. According to the NBBO, the national best bid (NBB) is 122.20 on the ISE for 5000 shares and the national best offer (NBO) is 122.26 on the PHLX for 10,000 shares. At 804, Dark Trading Facility Order No. 1, which is a sell order for 5000 shares at a price of 122.26 with no MTV, is shown. At 806, Securities Exchange DBK Order No. 1, which is a sell order for 5000 shares at a price of 122.27, is shown. At 808, the PHLX Order is shown, which is a sell order for 10,000 shares at a price of 122.26. At 810, Dark Trading Facility Order No. 2 that has been newly entered on Dark Trading Facility 102 is shown, which is a buy order for 100,000 shares at a price of 122.27 with no MTV. From this set of orders and the NBBO, Dark Trading Facility 102 will allocate 10,000 shares to PHLX, 85,000 shares to the securities exchange DBK, and 5000 shares within the Dark Trading Facility.

In more detail, given the execution priority described above, Dark Trading Facility Order No. 2 that has just been entered will send 85,000 shares to the securities exchange DBK at 122.27 ISO IOC. Dark Trading Facility Order No. 2 will execute a trade 5000 shares with the Securities Exchange DBK Order No. 1 at 122.27. Dark Trading Facility Order No. 2 will execute a trade of 5000 shares with Dark Trading Facility Order No. 1 at 122.26. Dark Trading Facility Order No. 2 routes 10,000 shares to PHLX of the away markets at 122.26 ISO IOC. The 10,000 shares routed to PHLX will fill the PHLX Order.

After the trade is executed in the securities exchange for 5000 shares, the residual 80,000 shares are sent back to Dark Trading Facility 102 where they will be posted in the buy section of the Dark Trading Facility system database at a price of 122.27. As shown in this example, the price for the PHLX Order was protected.

According to the preferred operation of Dark Trading Facility 102, if contra side liquidity in the securities exchange DBK is priced equal to or better than liquidity in the Dark Trading Facility, the order entered on the Dark Trading Facility will be sent to the securities exchange in the form of an ISO IOC order. If the order sent to the securities exchange DBK is not fully executed against the securities exchange DBK, the securities exchange will route the residual shares back to the Dark Trading Facility with a new MTV, when applicable, where it will interact with the contra side liquidity in the Dark Trading Facility system database or be posted until it executes against new contra side liquidity or be canceled back to the Dark Trading Facility User without routing to away markets for execution. Referring to FIG. 9, a description will be provided directed to the operation of the Dark Trading Facility where there are equal or better prices at the securities exchange DBK.

Referring to FIG. 9, generally at 900, an exemplary NBBO and a set of order information are provided for describing operation of the Dark Trading Facility with regard to equal or better prices being available at the securities exchange DBK. At 902, the NBBO is shown for a particular security. According to the NBBO, the national best bid (NBB) is 122.20 on the ISE for 5000 shares and the national best offer (NBO) is 122.26 on the PHLX for 10,000 shares. At 904, Dark Trading Facility Order No. 1, which is a sell order for 5000 shares at a price of 122.26 with no MTV, is shown. At 906, Securities Exchange DBK Order No. 1, which is a sell order for 5000 shares at a price of 122.26, is shown. At 908, the PHLX Order is shown, which is a sell order for 10,000 shares at a price of 122.26. At 910, Dark Trading Facility Order No. 2 that has been newly entered on Dark Trading Facility 102 is shown, which is a buy order for 5000 shares at a price of 122.26 with no MTV. From this set of orders and the NBBO, Dark Trading Facility 102 will allocate nothing to the protected quotes of away markets, 5000 shares to the securities exchange DBK, and nothing for trading within the Dark Trading Facility.

In greater detail, Dark Trading Facility Order No. 2 will send 5000 shares to the securities exchange DBK at 122.26 ISO IOC. Dark Trading Facility Order No. 2 will execute a trade of 5000 shares with Dark Trading Facility Order No. 1 at 122.26. There will be nothing in residual shares to return to the Dark Trading Facility for filling the Dark Trading Facility Order No. 1 or for routing to the away markets to fill the PHLX Order.

In situations in which contra side liquidity in the Dark Trading Facility system database is priced better than the price quoted on the securities exchange DBK, a newly entered Dark Trading Facility order will execute against the contra side liquidity in the Dark Trading Facility system database in price/time priority to the fullest extent possible, then it would be sent to the securities exchange DBX. Even further, a newly entered Dark Trading Facility order may be executed in the Dark Trading Facility without interacting with the securities exchange DBK when the price of the Dark Trading Facility Order is within the NBBO and at a price that is better than all of the orders for that security on the securities exchange DBK.

Referring to FIG. 10, a description of the operation of the Dark Trading Facility when the Dark Trading Facility has the best price will be provided.

Referring to FIG. 10, generally at 1000, an exemplary NBBO and a set of order information is provided for describing the operation of the Dark Trading Facility when the Dark Trading Facility has the best price. At 1002, the NBBO is shown for a particular security. According to the NBBO, the national best bid (NBB) is 122.20 on the ISE for 5000 shares and the national best offer (NBO) is 122.26 on the PHLX for 5000 shares. At 1004, Dark Trading Facility Order No. 1, which is a sell order for 5000 shares at a price of 122.25 with no MTV, is shown. At 1006, Securities Exchange DBK Order No. 1, which is a sell order for 5000 shares at a price of 122.27, is shown. At 1008, the PHLX Order is shown, which is a sell order for 5000 shares at a price of 122.26. At 1010, Dark Trading Facility Order No. 2 that is a newly entered order on Dark Trading Facility 102 is shown, which is a buy order for 100,000 shares at a price of 122.25 with no MTV. From this set of orders and the NBBO, Dark Trading Facility 102 will allocate nothing to the protected quotes of away markets, nothing to the securities exchange DBK, and 5000 shares will be traded within the Dark Trading Facility.

In detail, Dark Trading Facility Order No. 2 will trade 5000 shares within Dark Trading Facility to fill Dark Trading Facility Order No. 1 at 122.25. The remaining 95,000 shares will be posted in the Dark Trading Facility system database at 122.25 for later trading or cancellation (if IOC). Because the prices for the securities exchange DBK and away markets shares are higher, the Dark Trading Facility Order No. 2 will not trade against these share amounts.

In the operation of Dark Trading Facility 102 when two Dark Trading Facility orders are marketable against each other and there is no marketable contra side liquidity on the securities exchange DBK or on other away markets, and the prices cross, the Dark Trading Facility will calculate the price for execution of the trade at the price nearest to or at the midpoint of the NBBO. Referring to FIGS. 11A and 11B, examples of crossing orders will be described.

Referring to FIG. 11A, generally at 1100, an exemplary NBBO and representative orders are provided for describing the operation of the Dark Trading Facility when orders cross in the Dark Trading Facility. At 1102, the NBBO is shown for a particular security. According to the NBBO, the national best bid (NBB) is 20.00 on the PHLX and the national best offer (NBO) is 20.05 on the ISE. The NBBO midpoint is 20.025. At 1104, Dark Trading Facility Order No. 1, which is a buy order for 50,000 shares at a price of 20.02 with a MTV of 20,000 shares, is shown. At 1106, Dark Trading Facility Order No. 2 is shown, which is a sell order for 100,000 shares at a price of 20.00 with a MTV of 20,000 shares. As is seen, the buy and sell prices of these orders cross and are in the NBBO range. Therefore, from this set of orders and the NBBO, Dark Trading Facility 102 will execute a trade with an execution price of 20.02, which is the price closest to the NBBO midpoint.

Referring to FIG. 11B, generally at 1120, an exemplary NBBO and representative orders are provided for describing another example of NBBO midpoint executions when orders cross in the Dark Trading Facility. At 1122, the NBBO is shown for a particular security. According to the NBBO, the national best bid (NBB) is 122.20 on the ISE for 5000 shares and the national best offer (NBO) is 122.26 on the PHLX for 10,000 shares. The NBBI midpoint is 122.23. At 1124, Securities Exchange DBK Order No. 1, which is a sell order for 5000 shares at a price of 122.26, is shown. At 1126, Securities Exchange DBK Order No. 2 is shown, which is a buy order for 5000 shares at a price of 122.20. At 1128, Dark Trading Facility Order No. 1, which is a sell order for 75,000 shares at a price of 122.22 with a MTV of 50,000 shares, is shown. At 1130, Dark Trading Facility Order No. 2 is shown, which is a buy order for 100,000 shares at a price of 122.26 with a MTV of 50,000 shares Day. From this set of orders and the NBBO, Dark Trading Facility 102 will allocate 25,000 shares to securities exchange DBK, 75,000 shares within the Dark Trading Facility (since the MTVs of Dark Trading Facility Order Nos. 1 and 2 will have been triggered), and nothing will be sent to the away markets.

Reviewing this allocation in greater detail, Dark Trading Facility Order No. 2 will send 25,000 shares to securities exchange DBK at 122.26. Dark Trading Facility Order No. 2 will execute a trade of 75,000 shares within Dark Trading Facility to fill Dark Trading Facility Order No. 1 at 122.23, the NBBO midpoint. Dark Trading Facility Order No. 2 will execute a trade with Securities Exchange DBK Order No. 1 for 5000 shares at 122.26. The unfilled balance of 20,000 shares of the Dark Trading Facility Order No. 2 will be posted in the Dark Trading Facility at 122.26 with a new MTV of 20,000 shares.

There can be circumstances in which a new order enters the security exchange market that will change the NBBO. Preferably, Dark Trading Facility 102 will process and execute these new orders in the same sequence as described previously until the close of the regular trading session of the securities exchange. At this time, all remaining orders will be canceled back to the Training Facility users.

Preferably, the Dark Trading Facility will accept orders with round lots or PRLs, and reject odd lot orders. However, it is understood that the Dark Trading Facility could be configured to accept odd lots and still be within the scope of the present invention.

Dark Trading Facility 102 is preferably configured not to operate with regard to pricing increments smaller than $0.01 if the bid or offer, or order is priced equal to or greater than $1.00 per share. Further, preferably, Dark Trading Facility 102 will not be configured to operate with regard to increments smaller than $0.0001 if the bid or offer, or orders is priced less than $1.00 per share. However, it is understood by one skilled in the art that Dark Trading Facility can be configured to operate without these constraints and still be within the scope of the present invention.

Preferably, Dark Trading Facility 102 will not accept Dark Trading Facility taking orders priced below $1.00. Moreover, preferably Dark Trading Facility execution prices will be calculated to only the third decimal when the NBBO is an odd penny spread and the trade price is greater than $1.00. Again, however, it is understood by one skilled in the art that Dark Trading Facility can be configured to operate without these constraints and still be within the scope of the present invention.

It is understood that that the details of each Dark Trading Facility trade may be automatically matched and compared by the security exchange and will be submitted for clearing and settlement, e.g., on a lock-in basis. The method of clearing and settlement may be conventional except with respect to the anonymous treatment of trades in the Dark Trading Facility. As such, the Dark Trading Facility transaction reports preferably will indicate the details of the transaction but not disclose the contra party's or the clearing firm's identity.

The terms and expressions which are used herein are used as terms of expression and not of limitation. And, there is no intention, in the use of such terms and expressions, of excluding the equivalents of the features shown and described, or portions thereof, it being recognized that various modifications are possible in the scope of the invention.

The invention claimed is:

1. A computer-based system for integrating a computer-based electronic securities exchange and a computer-based dark trading facility (DTF) into a single computer-based electronic marketplace for providing DTF system users access to the computerized electronic securities exchange and securities exchange system users access to the computer-based DTF, comprising:

the single computer-based electronic marketplace including at least,
(a) a DTF computer processor being configured to connect to an electronic securities exchange processor of the computer-based electronic securities exchange, and accessed by securities exchange system user electronic input devices through the electronic securities exchange processor and accessed by DTF system user electronic input devices for entering buy and sell orders in the DTF computer processor for trading, with the DTF computer processor having,
(1) a first interface configured for connecting the DTF computer processor to a plurality of DTF system user electronic input devices, with the first interface configured for receiving and processing buy and sell orders submitted to the DTF computer processor by DTF system user electronic input devices,
(2) a second interface configured for connecting the DTF computer processor and the electronic securities exchange processor, with the second interface configured for receiving and processing the order information from the electronic securities exchange processor for displayed and non-displayed orders in an order book for buy and sell orders input from a plurality of securities exchange system user electronic input devices, and transmitting and processing contra side buy and sell orders posted or stored on a DTF electronic database for executing trades with listed buy and sell orders for displayed and non-displayed orders in the order book,
(3) the DTF electronic database configured for posting and storing buy and sell orders received from DTF system user electronic input devices,
(4) a matching engine configured for simultaneously viewing the DTF electronic database and order information for displayed and non-displayed orders in the order book and for executing trades between contra side buy and sell orders posted and stored in the DTF electronic database if a contra side buy and sell order is not first identified and matched in the DTF electronic database, and determining from order information transmitted from the electronic securities exchange processor to the DTF computer processor trading opportunities between listed buy and sell orders for displayed and non-displayed orders in the order book and contra side buy and sell orders posted and stored in the DTF electronic database, and
(5) an order router configured for routing to the electronic securities exchange processor for executing trades contra side posted or stored buy and sell orders in the DTF electronic database determined by the matching engine from order information to be trading opportunities with listed buy and sell orders for displayed and non-displayed orders in the order book listed on the computer-based electronic securities exchange; and
(b) the electronic securities exchange processor configured to connect to the DTF computer processor and for receiving and listing in the order book that includes displayed and non-displayed buy and sell orders for securities entered on the computer-based electronic securities exchange by a plurality of securities exchange system user electronic input devices and executing trades between contra side buy and sell orders for securities according to predetermined trading rules of the computer-based electronic securities exchange.

2. The system as recited in claim 1, wherein the non-displayed orders for listed buy and sell orders for securities include reserve orders.

3. The system as recited in claim 1, wherein the computer-based electronic securities exchange includes a listing of other automated trading centers, which listing may include zero or more other automated trading centers.

4. The system as recited in claim 1, wherein inputs to the DTF system user electronic input devices include inputs from securities traders.

5. The system as recited in claim 4, wherein securities traders include broker-dealers, electronic communications networks, alternative trading systems, or electronic securities exchanges.

6. A computer-implemented method for integrating a computer-based dark trading facility (DTF) and an computer-based electronic securities exchange to form a single electronic marketplace for providing DTF system users access to the computerized electronic securities exchange and securities exchange system users access to the computer-based DTF, comprising the steps of:

(a) electronically transmitting from DTF system user electronic input devices to a DTF computer processor buy and sell orders;
(b) determining that contra side buy and sell orders are matched in the DTF electronic database, and upon determining that a countryside buy and sell order is not identified and matched in the DTF database, posting and storing such buy and sell orders in a DTF electronic database;
(c) electronically transmitting from the computer-based electronic security exchange to the DTF computer processor buy and sell order information regarding listed buy and sell orders for displayed and non-displayed orders in an order book on the electronic security exchange from a plurality of securities exchange system user electronic input devices;
(d) the DTF computer processor simultaneously viewing the DTF electronic database and order information for displayed and non-displayed orders in the order book for determining trading opportunities between listed buy and sell orders for displayed and non-displayed orders in the order book and contra side buy and sell orders posted or stored in the DTF electronic database;
(e) the DTF computer processor electronically transmitting contra side buy and sell orders posted or stored in the DTF electronic database determined at step (d) from the DTF to the electronic securities exchange for executing trades; and
(f) executing trades between contra side buy and sell orders transmitted at step (e) and listed buy and sell orders for displayed and non-displayed orders in the order book.

7. The method as recited in claim 6, wherein step (c) further includes electronically transmitting to the DTF computer processor order information with regard to buy and sell orders from other automated trading centers listed on the electronic securities exchange, which listing of other automated trading centers may include buy and sell order information with regard to zero or more other automated trading centers.

8. The method as recited in claim 7, wherein step (d) further includes the DTF computer processor determining from the order information trading opportunities between buy and sell orders listed in the electronic securities exchange for other automated trading centers and contra side buy and sell orders posted or stored in the DTF electronic database.

9. The method as recited in claim 8, wherein the method further includes
   (g) electronically transmitting from the DTF computer processor to applicable other automated trading centers contra side buy and sell orders posted or stored in the DTF electronic database determined by the DTF computer processor to be trading opportunities with the buy and sell orders on such applicable other automated trading centers and executing trades between contra side buy and sell orders posted or stored in the DTF electronic database and buy and sell orders on such applicable other automated trading centers.

10. The method as recited in claim 9, wherein the DTF computer processor determining if the predetermined minimum contra side share value is met includes the DTF computer processor calculating a number of potentially available contra side shares listed as displayed and non-displayed orders in the order book for such specific posted or stored buy or sell order in the DTF electronic database.

11. The method as recited in claim 9, wherein the DTF computer processor determining if the predetermined minimum contra side share value is met includes the DTF computer processor calculating an aggregate of a number of potentially available contra side shares listed as displayed and non-displayed orders in the order book and posted or stored in the DTF electronic database for such specific posted or stored buy or sell order in the DTF electronic database.

12. The method as recited in claim 9, wherein the DTF computer processor determining if the predetermined minimum contra side share value is met includes the DTF computer processor calculating an aggregate of a number of potentially available contra side shares listed as displayed and non-displayed orders in the order book, posted or stored in the DTF electronic database, and on other automated trading centers for such specific posted or stored buy or sell order in the DTF electronic database.

13. The method as recited in claim 6, wherein trade execution reporting includes a unique recording designation for trades executed by the DTF computer processor.

14. The method as recited in claim 6, wherein trades executed at step (ef) include anonymous trades.

15. The method as recited in claim 6, wherein trades executed at step (ef) include automatically executed trades.

16. The method as recited in claim 9, wherein trades executed at step (fg) include anonymous trades.

17. The method as recited in claim 9, wherein trades executed at step (fg) include automatically executed trades.

18. The method as recited in claim 6, wherein inputs to the DTF system user electronic input devices include inputs from securities traders.

19. The method as recited in claim 18, wherein securities traders include broker-dealers, electronics communications networks, alternative trading systems, or electronic securities exchanges.

* * * * *